(12) United States Patent
El-Maleh et al.

(10) Patent No.: US 7,023,880 B2
(45) Date of Patent: Apr. 4, 2006

(54) RE-FORMATTING VARIABLE-RATE VOCODER FRAMES FOR INTER-SYSTEM TRANSMISSIONS

(75) Inventors: Khaled Helmi El-Maleh, San Diego, CA (US); Ananthapadmanabhan Arasanipalai Kandhadai, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 328 days.

(21) Appl. No.: 10/282,568

(22) Filed: Oct. 28, 2002

(65) Prior Publication Data

US 2004/0081195 A1    Apr. 29, 2004

(51) Int. Cl.
    *H04J 3/22* (2006.01)
(52) U.S. Cl. ................................. 370/466; 370/335
(58) Field of Classification Search ............... 370/320, 370/335, 342, 466, 465; 704/201, 219, 221, 704/200
    See application file for complete search history.

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,475,686 A | * | 12/1995 | Bach et al. ................. 370/465 |
| 5,640,386 A | * | 6/1997 | Wiedeman ................. 370/320 |
| 5,774,496 A | | 6/1998 | Butler et al. |
| 5,796,757 A | * | 8/1998 | Czaja .......................... 714/789 |
| 5,995,923 A | * | 11/1999 | Mermelstein et al. ........ 704/219 |
| 6,006,189 A | * | 12/1999 | Strawczynski et al. ..... 704/270 |
| 6,141,353 A | * | 10/2000 | Li ................................ 370/465 |
| 6,393,074 B1 | * | 5/2002 | Mandyam et al. ........... 375/341 |
| 6,424,631 B1 | * | 7/2002 | Czaja et al. ................. 370/252 |
| 6,542,486 B1 | * | 4/2003 | Lewis et al. ................. 370/335 |
| 6,718,183 B1 | * | 4/2004 | Blust et al. .................. 455/560 |
| 6,721,712 B1 | * | 4/2004 | Benyassine et al. ......... 704/503 |
| 2002/0077812 A1 | * | 6/2002 | Suzuki et al. ............... 704/230 |
| 2002/0080725 A1 | * | 6/2002 | Bradley ....................... 370/252 |
| 2002/0111798 A1 | * | 8/2002 | Huang .......................... 704/220 |
| 2002/0191693 A1 | * | 12/2002 | Nakagaki .................. 375/240.1 |
| 2003/0043814 A1 | * | 3/2003 | Lee ........................... 370/395.6 |
| 2003/0177004 A1 | * | 9/2003 | Jabri et al. ................... 704/219 |
| 2004/0037314 A1 | * | 2/2004 | Spear ........................... 370/466 |

OTHER PUBLICATIONS

3GPP TS 26.090 v4.0.0 (Mar. 2001).*

* cited by examiner

*Primary Examiner*—Steven Nguyen
*Assistant Examiner*—Clemence Han
(74) *Attorney, Agent, or Firm*—Philip Wadworth; Charles D. Brown; Kyong H. Macek

(57) ABSTRACT

Methods and apparatus are presented for supporting the transmission of variable-rate vocoder frames over non-compatible communication channels. Variable-rate vocoder frames are reformatted as cargo in multi-rate vocoder frames. At the receiver, a determination is made as to whether a received multi-rate vocoder frame carries a variable-rate vocoder frame cargo. If a variable-rate vocoder frame is cargo, then a determination of the frame type is made. Various embodiments for conveying cargo information are presented.

25 Claims, 8 Drawing Sheets

AMR VOCODER FRAME

| 1 MODE BIT | 171 BITS | 12 CRC BITS | 8 TAIL BITS |

FULL RATE FRAME

| 80 BITS | 8 CRC BITS | 8 TAIL BITS |

HALF RATE FRAME

| 40 BITS | 8 TAIL BITS |

QUARTER RATE FRAME

| 16 BITS | 8 TAIL BITS |

EIGHTH RATE FRAME

FIG. 3A: RATE SET 1 FOR VARIABLE-RATE VOCODER

ERASURE BIT

| 1 | 267 BITS | 12 CRC BITS | 8 TAIL BITS |

FULL RATE FRAME

| 1 | 125 BITS | 10 CRC BITS | 8 TAIL BITS |

HALF RATE FRAME

| 1 | 55 BITS | 8 CRC BITS | 8 TAIL BITS |

QUARTER RATE FRAME

| 1 | 21 BITS | 6 CRC BITS | 8 TAIL BITS |

EIGHTH RATE FRAME

FIG. 3B: RATE SET 2 FOR VARIABLE-RATE VOCODER

RE-FORMATTING VARIABLE-RATE VOCODER FRAMES FOR INTER-SYSTEM TRANSMISSIONS

BACKGROUND

I. Field

The present invention relates to data communication. More particularly, the present invention relates to re-formatting variable-rate vocoder frames for intersystem transmissions.

II. Description of the Related Art

The field of wireless communications has many applications including, e.g., cordless telephones, paging, wireless local loops, personal digital assistants (PDAs), Internet telephony, and satellite communication systems. A particularly important application is cellular telephone systems for remote subscribers. As used herein, the term "cellular" system encompasses systems using either cellular or personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well-known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA. Another CDMA standard is the W-CDMA standard, as embodied in 3rd Generation Partnership Project "3GPP", Document Nos. 3G TS 25.211, 3G TS 25.212, 3G TS 25.213, and 3G TS 25.214.

Each standard defines how various types of information are processed for transmission. In a typical communication system, an encoder generates a stream of information bits representing voice or data traffic. This stream of bits is subdivided and grouped, concatenated with various control bits, and packed into a suitable format for transmission. Voice and data traffic can be transmitted in various formats according to the appropriate communication standard, such as, e.g., frames, packets, and subpackets. For the purpose of illustrative ease, the term "frame" will be used herein to describe the transmission format in which traffic is carried. However, the term "frame" will also be used herein to describe the output of a speech coder. The definition of the word will depend upon the context in which the word is used A speech coder is a device that extracts parameters relating to a model of human speech generation and then uses these parameters to compress the speech for transmissions. Speech coders typically comprise an encoder and a decoder. A speech coder divides the incoming speech signal into blocks of time, or analysis frames. The encoder analyzes the incoming speech frame to extract certain relevant parameters, and then quantizes the parameters into binary representation. The binary representation is packed into transmission frames and is transmitted over a communication channel to a receiver with a decoder. The decoder processes the transmission frames, unquantizes them to produce the parameters, and resynthesizes the speech frames using the unquantized parameters. Speech coders are also referred to as voice coders, or "vocoders," and the terms will be used interchangeably herein.

The function of the speech coder is to compress the digitized speech signal into a low-bit-rate signal by removing all of the natural redundancies that are inherent in speech. The digital compression is achieved by representing the input speech frame with a set of parameters and employing quantization to represent the parameters with a set of bits. If the input speech frame has a number of bits $N_i$ and the output frame produced by the speech coder has a number of bits $N_o$, then the compression factor achieved by the speech coder is $C_r = N_i/N_o$. The challenge is to retain the high voice quality of the decoded speech while achieving a target compression factor. The performance of a speech coder depends on how well the speech model, or the combination of the analysis and synthesis process described above, performs, and how well the parameter quantization process is performed at the target bit rate of $N_o$ bits per frame. Thus, the goal of the speech model is to capture the essence of the speech signal, or the target voice quality, with a small set of parameters for each frame.

Different types of speech coders are deployed in the various existing wireless communication systems, often using quite dissimilar speech compression techniques. Moreover, the transmission frame formats and processing that are defined by one particular standard is most likely different from those of other standards. For example, CDMA standards support the use of variable-rate vocoder frames in a spread spectrum environment while GSM standards support the use of fixed-rate vocoder frames and multi-rate vocoder frames. Similarly, Universal Mobile Telecommunications Systems (UMTS) standards also support fixed-rate and multi-rate vocoders, but not variable-rate vocoders. For compatibility and interoperability between these communication systems, it is highly desirable to enable the support of variable-rate vocoder frames within GSM and UMTS systems, and the support of non-variable rate vocoder frames within CDMA systems. The support of multi-rate vocoder frames within CDMA standards is addressed in co-pending U.S. patent application Ser. No. 09/755,843, entitled, "METHOD AND APPARATUS FOR SUPPORTING ADAPTIVE MULTI-RATE (AMR) DATA IN A CDMA COMMUNICATION SYSTEM," which is assigned to the assignee of the present invention and incorporated by reference herein. However, there is still a present need to support the transmission of variable-rate vocoder frames within heretofore non-compatible systems.

SUMMARY

Methods and apparatus are presented herein to enable inter-operability between non-compatible systems. In one aspect, an apparatus is presented for supporting the transmission of variable-rate vocoder frames within a non-compatible system, the apparatus comprising an infrastructure element configured to identity a frame type of a received variable-rate vocoder frame, to re-order bits of the received variable-rate vocoder frame according to the frame type, and to construct a multi-rate vocoder frame using the re-ordered bits.

In another aspect, an apparatus for re-formatting variable-rate vocoder frames as multi-rate vocoder frames is presented, the apparatus comprising: a frame type identifier for identifying a frame type of the variable-rate vocoder frame; an infrastructure element configured to re-order bits of the variable-rate vocoder frame according to the frame type; and a frame generator for constructing a multi-rate vocoder frame, wherein a cargo of the multi-rate vocoder frame comprises the re-ordered bits of the variable-rate vocoder frame.

In another aspect, an apparatus for supporting variable-rate vocoder frames within a non-compatible system is presented, the apparatus comprising: a demodulation subsystem for demodulating a received multi-rate vocoder frame; a system discriminator for determining whether the demodulated multi-rate vocoder frame carries a variable-rate vocoder frame as cargo; a combiner for re-ordering the multi-rate vocoder frame cargo into a variable-rate vocoder frame; and a decoder configured to decode the variable-rate vocoder frame.

In another aspect, a method for re-formatting variable-rate vocoder frames as multi-rate vocoder frames is presented, the method comprising: identifying a frame type of a received variable-rate vocoder frame; re-ordering the bits of the received variable-rate vocoder frame; and constructing a multi-rate vocoder frame, wherein the re-ordered bits comprise a cargo of the multi-rate vocoder frame.

In another aspect, a method for supporting variable-rate vocoder frames within a non-compatible system is presented, the method comprising: receiving a multi-rate vocoder frame; determining whether the multi-rate vocoder frame carries a variable-rate vocoder frame cargo; and if the multi-rate vocoder frame carries a variable-rate vocoder frame cargo, then: identifying a frame type of the variable-rate vocoder frame cargo; re-ordering the variable-rate vocoder frame cargo into a variable-rate vocoder frame; and decoding the variable-rate vocoder frame.

BRIEF DESCRIPTION OF THE DRAWINGS

FIGS. 3A and 3B are block diagrams of the variable-rate vocoder frame structure for Rate Set 1 and Rate Set 2, respectively.

DETAILED DESCRIPTION

Figure 1:
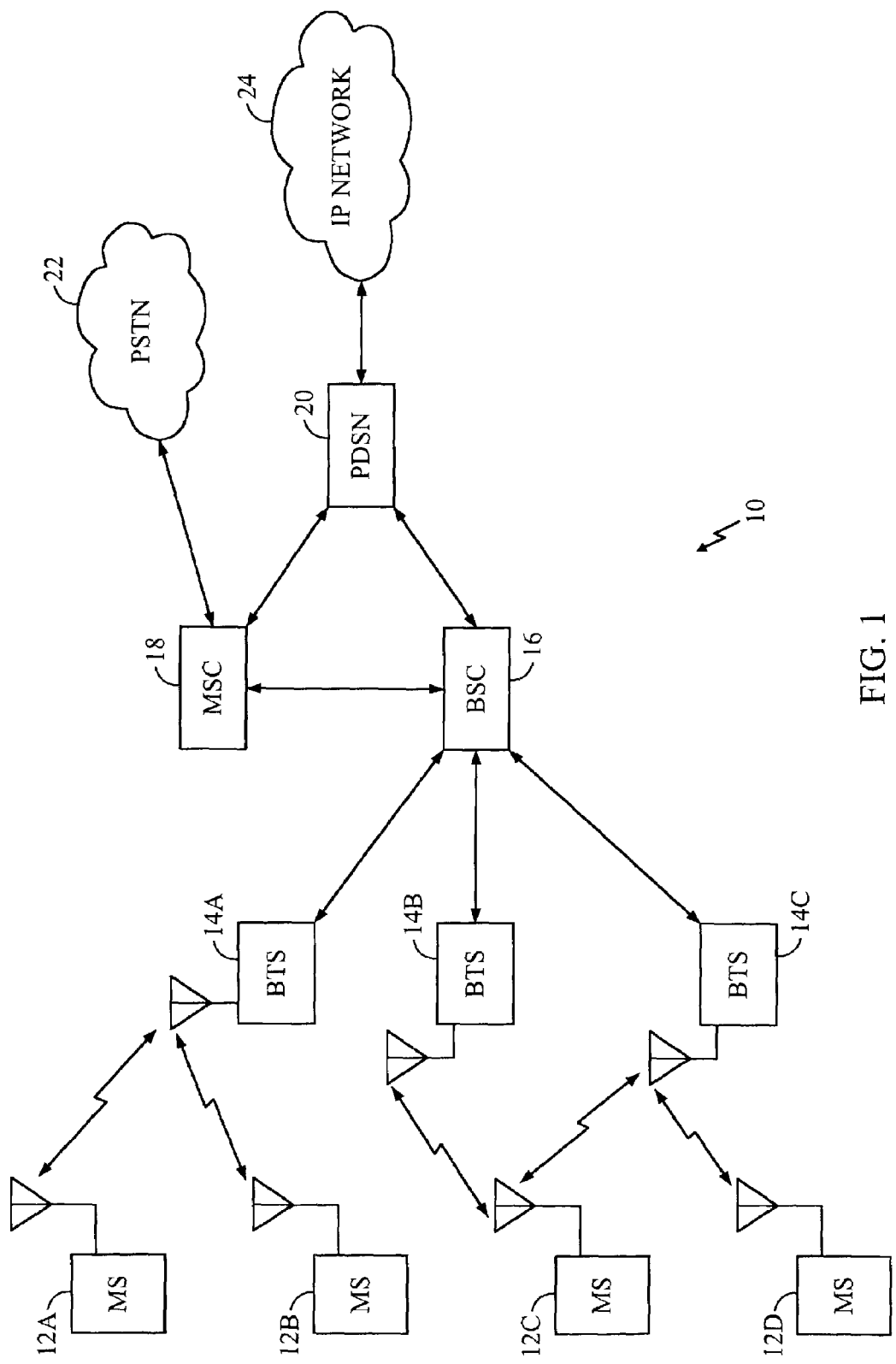
FIG. 1 is a diagram of a communication system that supports a number of users.

As illustrated in FIG. 1, a wireless communication network 10 generally includes a plurality of remote stations (also called subscriber units or mobile stations or user equipment) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four remote stations 12a–12a, three base stations 14a–14c, one BSC 16, one MSC 18, and one PDSN 20 are shown. It would be understood by those skilled in the art that there could be any number of remote stations 12, base stations 14, BSCs 16, MSCs 18, and PDSNs 20.

In one embodiment, the wireless communication network 10 is a packet data services network. The remote stations 12a–12d may be any of a number of different types of wireless communication device such as a portable phone, a cellular telephone that is connected to a laptop computer running IP-based Web-browser applications, a cellular telephone with associated hands-free car kits, a personal data assistant (PDA) running IP-based Web-browser applications, a wireless communication module incorporated into a portable computer, or a fixed location communication module such as might be found in a wireless local loop or meter reading system. In the most general embodiment, remote stations may be any type of communication unit.

The remote stations 12a–12d may advantageously be configured to perform one or more wireless packet data protocols such as described in, for example, the EIA/TIA/IS-707 standard. In a particular embodiment, the remote stations 12a–12d generate IP packets destined for the IP network 24 and encapsulates the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), Internet Protocol (IP), Point-to-Point Protocol (PPP), Frame Relay, High-bit-rate Digital Subscriber Line (HDSL), Asymmetric Digital Subscriber Line (ADSL), or other generic digital subscriber line equipment and services (xDSL). In an alternate embodiment, the BSC 16 is coupled directly to the PDSN 20, and the MSC 18 is not coupled to the PDSN 20.

During typical operation of the wireless communication network 10, the base stations 14a–14c receive and demodulate sets of reverse link signals from various remote stations 12a–12d engaged in telephone calls, Web browsing, or other data communications. As used herein, the "reverse link" comprises transmissions from a remote station directed towards a base station. Each reverse link signal received by a given base station 14a–14c is processed within that base station 14a–14c. Each base station 14a–14c may communicate with a plurality of remote stations 12a–12d by modulating and transmitting sets of forward link signals to the remote stations 12a–12d. As used herein, the "forward link" comprises transmissions from a base station directed towards a remote station. For example, as shown in FIG. 1, the base station 14a communicates with first and second remote stations 12a, 12b simultaneously, and the base station 14c communicates with third and fourth remote stations 12c, 12d simultaneously. The resulting packets are forwarded to the BSC 16, which provides call resource allocation and mobility management functionality including the orchestration of soft handoffs of a call for a particular remote station 12a–12d from one base station 14a–14c to another base station 14a–14c. For example, a remote station 12c is communicating with two base stations 14b, 14c simultaneously. Eventually, when the remote station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In a W-CDMA system, which is classified as a UMTS system, the terminology of the wireless communication system components differs, but the functionality is the same. For example, a base station is referred to as a Radio Network Controller (RNC) operating in a UMTS Terrestrial Radio Access Network (U-TRAN). The forward link is referred to as the "downlink" and the reverse link is referred to as the "uplink." However, the formatting of the transmission frames is very dissimilar. In a CDMA system, speech is coded using a variable-rate vocoder. In a GSM system or UMTS system, speech is coded using a fixed-rate vocoder or a multi-rate vocoder. An example of a variable-rate vocoder is the Selectable Mode Vocoder (SMV), which is promulgated in IS-893, an example of a multi-rate vocoder is the Adaptive Multi-Rate (AMR) vocoder, which is promulgated in "ETSI EN 301 704 Digital Cellular Telecommunications System; Adaptive Multi-Rate (AMR) Speech Transcoding" (the AMR standard), and an example of a fixed-rate vocoder is a Enhanced Full Rate vocoder, which is promulgated in 3GPP TS 46.060: "Digital cellular telecommunications system (Phase 2+); Enhanced Full Rate (EFR) speech transcoding."

Although the vocoder types are structurally and functionally different, common, generic terminology is used in describing the two types. For example, a "mode" in an AMR vocoder refers to a fixed data rate. However, a "mode" in an SMV vocoder refers to an average data rate, which is achieved by a mixture of different frame types. (More on this topic will be discussed below.) The meaning of the word should be read in context with the usage of the word. In order to minimize the confusion that might arise from using such commonly shared terms, the embodiments that will be described below will use the SMV vocoder configurations and terminology to represent variable-rate vocoders and the AMR vocoder configurations and terminology to represent fixed-rate and multi-rate vocoders. However, it should be noted that the scope of the embodiments extends to other variable-rate coders, such as the Enhanced Variable Rate Codec (EVRC) and the Wideband SMV (WB-SMV) coders, and other fixed-rate and multi-rate coders, such as the Enhanced Full Rate (EFR) and AMR-WB vocoders.

The embodiments that are described herein are for repackaging the contents of a variable-rate vocoder frame for transmissions over a non-compatible system. The converse problem of how to support the transmission of a multi-rate vocoder frame over a non-compatible system is addressed in aforementioned U.S. patent application Ser. No. 09/755,843.

Figure 2:
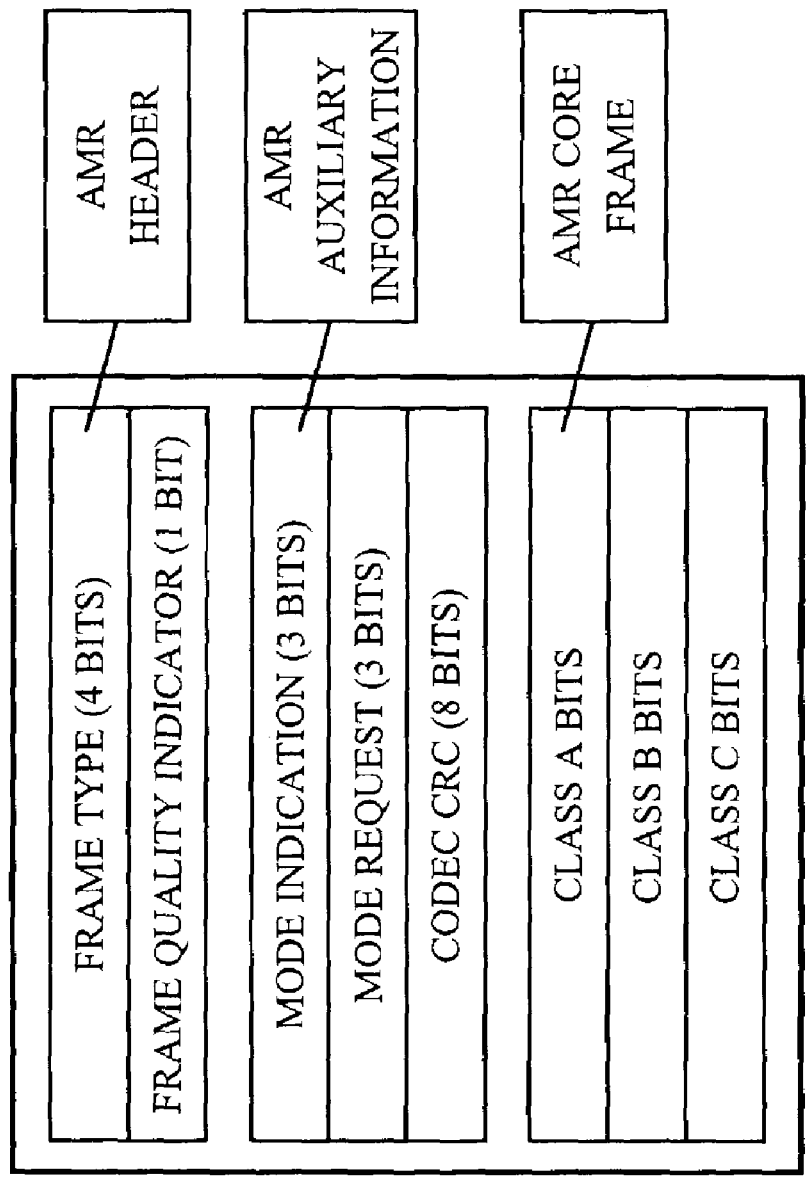
FIG. 2 is a block diagram of the AMR frame structure.

The AMR vocoder outputs both speech and comfort noise frames. The AMR frame structure is shown in FIG. 2. An AMR Header part includes the Frame Type field and the Frame Quality Indicator field. The AMR Auxiliary Information part includes the Mode Indication field, Mode Request field, and Codec CRC field. The AMR Core Frame part carries the speech parameter bits or the comfort noise parameter bits. The speech parameter bits are categorized as Class A, Class B, or Class C.

Class A bits comprise the most important bits, Class B bits are the next most important bits, and Class C bits are the least important bits. Because of the designated difference in importance, the bits for each class are transmitted via a different "transport" channel capable of providing different processing (e.g., error correction and detection coding, rate matching, and so on), which may be selected to be commensurate with the level of importance of the class. For example, convolutional encoding and cyclic redundancy check (CRC) may be employed for Class A bits, convolutional encoding but no CRC may be employed for Class B bits, and no convolutional encoding nor CRC may be employed for Class C bits.

Table 1 lists the AMR modes specified by the W-CDMA standard, and the number of bits for Classes A, B, and C for each AMR mode. The classification of the bits into three classes, the number of bits for each class, and/or the total number of bits for each data block may be different from those listed in Table 1.

As shown in Table 1, AMR modes 0 through 7 are assigned to eight different AMR speech data rates, ranging from 4.75 kbps to 12.2 kbps. AMR modes 8 through 11 are used for sending different types of silence descriptor (SID) information, which are used to construct the comfort noise frames. AMR modes 12–14 are reserved for future use, and AMR mode 15 represents no data transmission.

TABLE 1

AMR Modes

| AMR Mode Index | Mode Description | Total Class A, B, & C bits | Class A bits | Class B bits | Class C bits |
| --- | --- | --- | --- | --- | --- |
| 0 (AMR4.75) | 4.75 kbps Speech | 95 | 42 | 53 | 0 |
| 1 (AMR5.15) | 5.15 kbps Speech | 103 | 49 | 54 | 0 |
| 2 (AMR5.90) | 5.90 kbps Speech | 118 | 55 | 63 | 0 |
| 3 (AMR6.70) | 6.70 kbps Speech | 134 | 58 | 76 | 0 |
| 4 (AMR7.40) | 7.40 kbps Speech | 148 | 61 | 87 | 0 |
| 5 (AMR7.95) | 7.95 kbps Speech | 159 | 75 | 84 | 0 |
| 6 (AMR10.2) | 10.2 kbps Speech | 204 | 65 | 99 | 40 |
| 7 (AMR12.2) | 12.2 kbps Speech | 244 | 81 | 103 | 60 |
| 8 | GSM-AMR SID | 39 | 39 | 0 | 0 |
| 9 | GSM-EFR SID | 42 | 42 | 0 | 0 |
| 10 | IS-641 SID | 38 | 38 | 0 | 0 |
| 11 | PDC-EFR SID | 37 | 37 | 0 | 0 |
| 12–14 | For Future Use | TBD | TBD | TBD | TBD |
| 15 | No Transmission | 0 | 0 | 0 | 0 |

In contrast to the 15 different modes, each representing a fixed data rate, a variable-rate vocoder outputs full-rate, half-rate, quarter-rate, and eight-rate frames. The structure of each frame type is shown in FIG. 3A and FIG. 3B. FIG. 3A is the structure of a frame when the variable-rate vocoder is operating according to Rate Set 1, and FIG. 3B is the structure of a frame when the variable-rate vocoder is operating according to Rate Set 2. Each frame carries an ensure bit, a plurality of information bits, CRC bits (except for quarter-rate and eighth rate frames in Rate Set 1), and tail bits. In general, full-rate frames are used to carry transient (or voiced) speech, half-rate frames are used to carry voiced (or transient) speech, quarter-rate frames are used to carry unvoiced speech, and eighth-rate frames are used to carry background noise. Note that background noise refers to the acoustics in the background environment of the speaker, which may include speaker silence and background silence.

Hence, the variable-rate vocoder classifies the type of acoustic activity occurring within each analysis duration, selects an encoding mode to extract the signal parameters, and selects a frame type accordingly. As used in the context of variable rate vocoder, an "encoding mode" is used to refer to parameters in an encoding scheme, such as code excited linear prediction (CELP), that is used to extract the speech parameters. As used in the context of the fixed rate vocoder, a "mode" refers to a data rate, rather than an encoding scheme. One method for using speech classification to select the type of variable-rate vocoder frame for carrying the parameters of an analysis frame is presented in co-pending U.S. patent application Ser. No. 09/733,740, entitled, "METHOD AND APPARATUS FOR ROBUST SPEECH CLASSIFICATION," which is incorporated by reference herein and assigned to the assignee of the present invention. In this co-pending patent application, a voice activity detector, an LPC analyzer, and an open loop pitch estimator are configured to output information that is used by a speech classifier to determine various past, present and future speech frame energy parameters. These speech frame energy parameters are then used to more accurately and robustly classify acoustic signals into speech or nonspeech modes.

In the context of the SMV vocoder, the term "mode" is also used to refer to an average data rate, wherein different average data rates are achieved by changing the threshold energy parameters of the speech activity levels, which changes the type of frame that is selected to carry the speech. For example, if a SMV vocoder operates in "mode 0," then the speech activity levels can be set so that more voiced speech segments are carried by full-rate frames, rather than half-rate frames. Hence, over 60% of the output frames are full-rate frames and approximately 5% of the output frames are half-rate frames in mode 0. If the SMV vocoder is then set to operate in "mode 2," then the energy parameters of the speech activity levels can be reset so that fewer transient speech segments are carried by full-rate frames. Hence, approximately 11% of the output frames are full-rate frames and approximately 47% of the output frames are half-rate frames in mode 2. The mode of the SMV vocoder can be set by the network, but the actual frames used to carry the speech information are still determined by speech activity levels, i.e., the SMV vocoder and other variable-rate vocoders are "source controlled."

Figure 4:
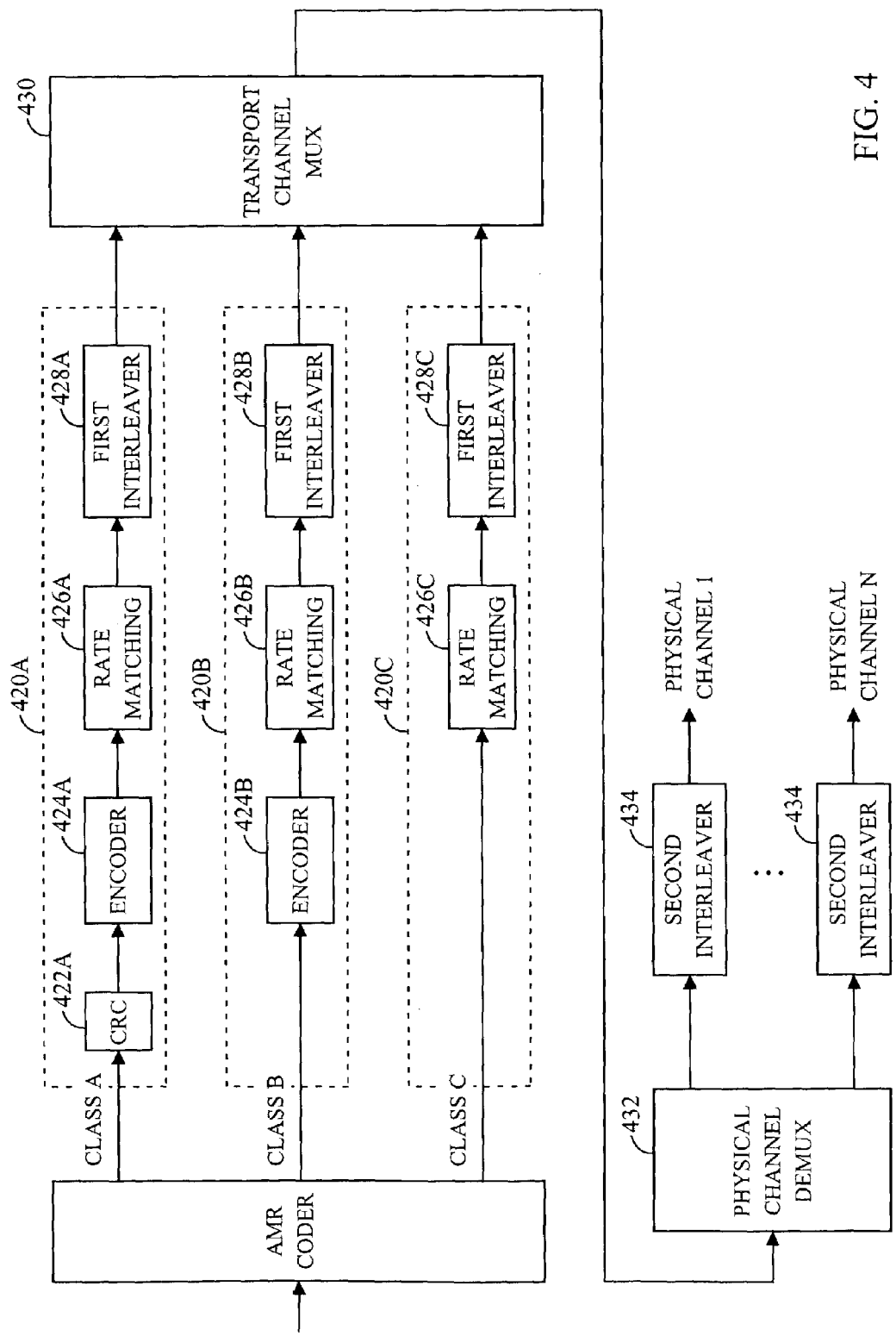
FIG. 4 is a block diagram of the processing within an AMR vocoder for a UMTS system.

In contrast, the AMR vocoder uses information as to the quality of the physical channel in order to select the mode, i.e., rate, at which the speech signal is sent. Hence, the rate is set explicitly by the network, not by speech activity levels. FIG. 4 is a block diagram of the processing which each class undergoes in an AMR vocoder operating in a W-CDMA environment. Class A bits are CRC coded (block 422a), convolutionally encoded (block 424a), rate matched (block 426a), and interleaved (block 428a) within a transport channel processor 420a. Class B bits are convolutionally encoded (block 424b), rate matched (block 426b), and interleaved (block 428b) within a transport channel processor 420b. And Class C bits are rate matched (block 426c) and interleaved (block 428c) within a transport channel processor 420c. The processed bits from transport channel processors 420a through 420c are then multiplexed into a coded composite transport channel (CCTrCH) by a transport channel multiplexer 430, and the CCTrCH is further demultiplexed into one or more physical channel streams by a physical channel demultiplexer 432. Each (20 msec) frame on each physical channel stream is further interleaved (block 434), and the resultant data stream comprises the data for the physical channel.

As discussed above, the output frame of the AMR vocoder has a generic structure comprising an AMR Header, an AMR Auxiliary Information, and AMR Core Frame. Within the AMR Core Frame, the bits produced by the speech encoder are reordered for error protection purposes. The speech bits are re-ordered according to tables, as proscribed in 3G TS 26.090, entitled "AMR Speech Codec; Speech Transcoding Functions." The speech encoder outputs bits that are denoted $\{s(1), s(2), s(3), \ldots, s(K)\}$, where K is the number of bits produced by the encoder. The placement of each output bit in the Core Frame is then performed in accordance with the appropriate table. The reordered bits are denoted as $\{d(0), d(1), d(2), \ldots, d(K-1)\}$ in decreasing order of importance. Hence, the value d(i) denotes the $i^{th}$ bit position in the AMR Core Frame.

For example, the ordering of the speech encoder bits for the 4.75 kbit/s mode is presented in Table 2. The top left corner of the table has index 0 and the table is read from left to right, so that the rightmost element of the last row has the index K-1, wherein K is the total number of speech bits in the specific mode.

TABLE 2

Ordering of the speech encoder bits for the 4.75 kbps mode: $table_0(j)$

| 0 | 1 | 2 | 3 | 4 | 5 | 6 | 7 | 8 | 9 |
|---|---|---|---|---|---|---|---|---|---|
| 10 | 11 | 12 | 13 | 14 | 15 | 23 | 24 | 25 | 26 |
| 27 | 28 | 48 | 49 | 61 | 62 | 82 | 83 | 47 | 46 |
| 45 | 44 | 81 | 80 | 79 | 78 | 17 | 18 | 20 | 22 |
| 77 | 76 | 75 | 74 | 29 | 30 | 43 | 42 | 41 | 40 |
| 38 | 39 | 16 | 19 | 21 | 50 | 51 | 59 | 60 | 63 |
| 64 | 72 | 73 | 84 | 85 | 93 | 94 | 32 | 33 | 35 |
| 36 | 53 | 54 | 56 | 57 | 66 | 67 | 69 | 70 | 87 |
| 88 | 90 | 91 | 34 | 55 | 68 | 67 | 69 | 70 | 87 |
| 92 | 31 | 52 | 65 | 86 | | | | | |

In this particular table, the $20^{th}$ output bit produced by the speech encoder would be associated with the placement value 27, i.e., the $20^{th}$ position in the table, $table_0(20)$, is 27.

In a CDMA system, voice and data traffic may be transmitted on one or more traffic channels over the forward or reverse links. (A traffic channel is akin to a physical channel in the W-CDMA system.) Each channel carries different types of information to the target destination. Typically, voice traffic is carried on fundamental channels, and data traffic is carried on supplemental channels or packet data channels. Supplemental channels are typically enabled for durations of time in the order of seconds and seldom change modulation and coding formats, whereas packet data channels are dynamically changed from one 20 ms interval to another. For the purposes of describing the embodiments herein, the supplemental channels and the packet data channels are generically referred to as data traffic channels.

Voice traffic and data traffic are typically encoded, modulated, and spread before transmission on either the forward or reverse links. The encoding, modulation, and spreading can be implemented in a variety of formats. Predetermined transmit formats, which correspond to a combination of various transmit parameters, can be used to simplify the choice of transmission formats. The transmission format corresponds to a combination of any or all of the following transmission parameters: the modulation scheme used by the system, the number of orthogonal or quasi-orthogonal codes, the data payload size in bits, the duration of the message frame, and/or details regarding the encoding scheme. Some examples of modulation schemes used within communication systems are the Quadrature Phase Shift Keying scheme (QPSK), 8-ary Phase Shift Keying scheme (8-PSK), and 16-ary Quadrature Amplitude Modulation (16-QAM). Some of the various encoding schemes that can be selectively implemented are convolutional encoding schemes, which are implemented at various rates, or turbo coding, which comprises multiple encoding steps separated by interleaving steps. Orthogonal and quasi-orthogonal codes, such as the Walsh code sequences, are used to channelize the information sent to each remote station on the forward link. In other words, Walsh code sequences are used on the forward link to allow the system to overlay multiple users, each assigned a different orthogonal or quasi-orthogonal code, on the same frequency during the same time duration.

Figure 5:
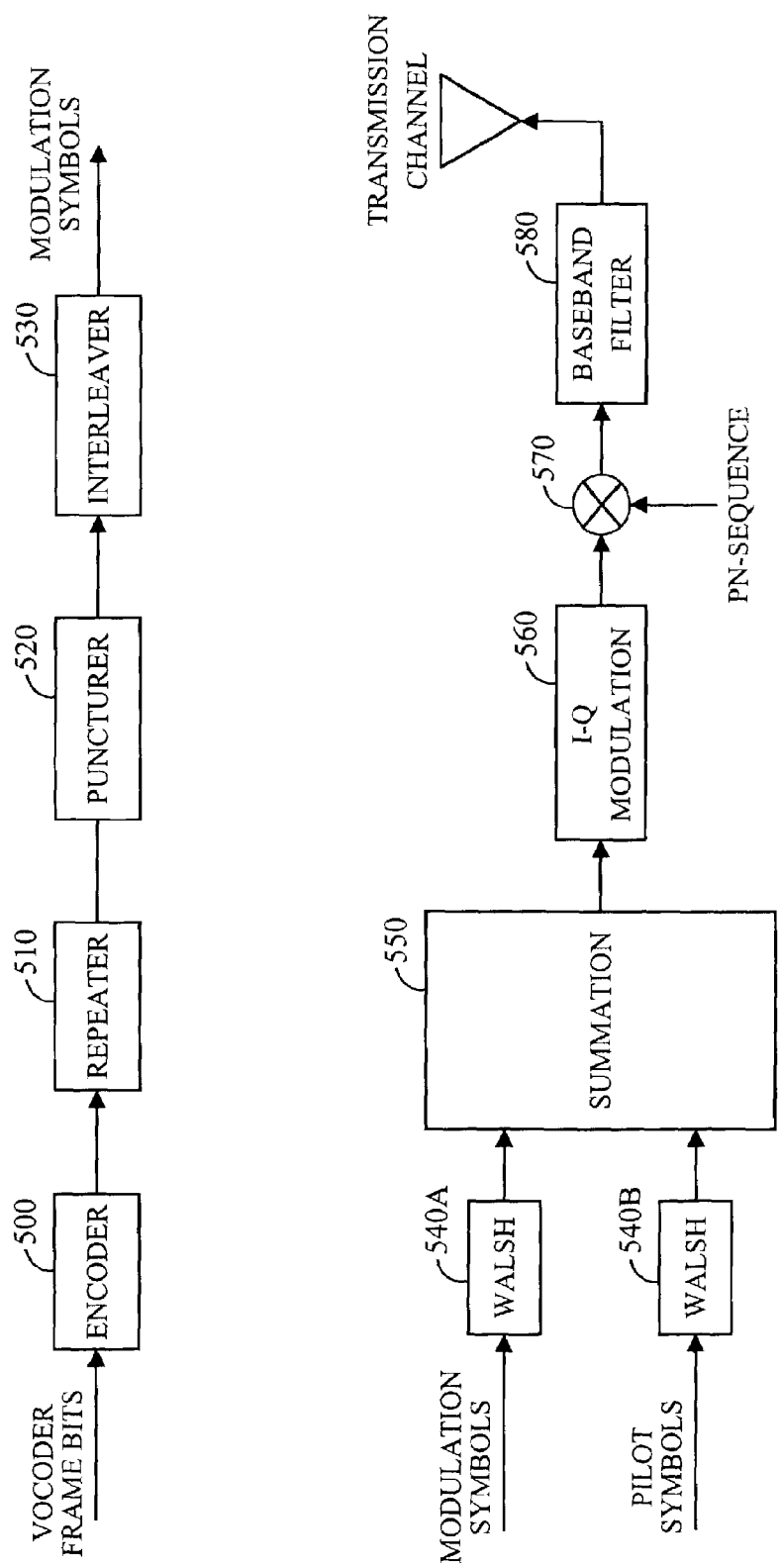
FIG. 5 is a functional block diagram of the processing structure for a forward link traffic channel in a CDMA system.

The transmit format and power on a forward data traffic channel are typically adjusted by a network element so as to ensure a high likelihood of successful reception. Successful decoding may be verified by a combination of one or several methods well known in the art, such as determining whether the cyclic redundancy check (CRC) bits of the data packet pass or fail, computing the re-encoded error rate, or computing the Yamamoto metric for Viterbi decoders. Note that the transmit format of a frame over a data traffic channel differs from the frame format of the vocoder output bits. FIG. 5 explains this difference in more detail.

FIG. 5 is a block diagram of the channel structure of a forward link traffic channel. The variable-rate vocoder produces bits, which are generated according to the selected frame format. The vocoder bits are encoded at block 500 for transmission over a channel. The encoding may comprise convolutional or turbo coding. A repeating element is represented at block 510, where the encoded bits are repeated at a predetermined repetition rate. The encoded and repeated symbols are then punctured at block 520. The rates at which encoding, repeating, and puncturing occur are system-defined parameters that rely upon transmission rate requirements (i.e., whether the output bits are part of a full-rate, half-rate, quarter-rate, or eighth-rate vocoder frame). Block 530 represents the interleaving process. The output of the interleaver is referred to herein as modulation symbols.

The modulation symbols that are the output of the interleaver at block 530 undergo orthogonal spreading by a Walsh covering element 540*a*. In addition, a pilot sequence is concurrently spread by Walsh covering element 540*b*. The outputs from blocks 540*a* and 540*b* are then combined at summation element block 550 and then spread in quadrature at block 560. At block 570, the resulting stream is PN-spread. At block 580, the resulting stream is baseband filtered and modulated onto a transmit carrier signal.

The embodiments that are described herein are for supporting the transportation of variable-rate vocoder frame contents in non-compatible communication systems. As used herein, a non-compatible system is one that is configured to carry fixed-rate vocoder frames or multi-rate vocoder frames. A non-compatible system can also be considered one that uses a different access technology from CDMA, for example, TDMA or GSM, wherein the processing and formatting of vocoder frames into channel transmission frames are different from the processing and formatting of FIG. 5.

The use of the embodiments described herein allows non-compatible systems to pass variable-rate vocoder frames without having to translate them into fixed-rate or multi-rate vocoder frame formats. Translation would entail the decoding of the variable-rate vocoder frame to synthesize the acoustic speech and the encoding of the acoustic speech using fixed-rate or multi-rate vocoder methodologies. Hence, the translation process can result in a degradation of the signal's acoustic quality. Instead, the variable-rate vocoder frames are re-formatted/re-packaged into a fixed-rate frame or a multi-rate vocoder frame.

In order to re-format the variable-rate vocoder frames for transmissions over a non-compatible system, the vocoder frames must be extracted from the channel transmission frames. The procedure and apparatus for retrieving the vocoder frames from the channel transmission frames are only of peripheral interest to the re-formatting problem presented herein, and will not be discussed in detail other than to describe a general methodology for retrieving the vocoder frames, which is to perform the processes that are the reverse of the processes described in FIG. 5. However, the embodiments described herein are such that the base station equivalents operating in the non-variable-rate system should be configured to recognize the arrival of variable-rate vocoder frames, in whatever form the arrival may appear, i.e., as a variable-rate vocoder frame or as a variable-rate vocoder frame carried within channel transmission frames. Hence, the embodiments are described under the assumption that the variable-rate vocoder frames are already at a transmission end of the non-compatible system.

In one embodiment, all variable-rate frame types are embedded by a transmission end within one of the higher modes of a multi-rate vocoder frame or embedded within one of the unassigned multi-rate vocoder frames. In one aspect of this embodiment, blind rate detection is needed at a receiving end in order to identify the frame types. In another aspect of this embodiment, overhead bits are used to differentiate between the different frame types.

In another embodiment, each variable-rate vocoder frame type is carried by an individual mode of the multi-rate vocoder at the transmission end. In one aspect of this embodiment, overhead bits that are arranged in recognizable patterns are used to inform the receiving end that the transmitted bits are non-AMR bits.

In yet another embodiment, the variable-rate vocoder frames are embedded in the already assigned modes of the multi-rate vocoder at a transmission end.

In order to perform the above embodiments, the receiving end should have both a multi-rate decoder and a variable-rate decoder.

Single Mode Embodiments

In this embodiment, one frame type from either the unassigned Frame Types of the multi-rate vocoder or the assigned Frame Types of the multi-rate vocoder can be used solely to carry variable-rate vocoder frame contents, i.e., all variable-rate vocoder frames are carried by a single higher rate mode of the multi-rate vocoder. For example, in Table 1, one of the unassigned mode indexes 12–14 can be assigned to the support of variable-rate frames. A high rate can be mandated, such as, for example, 14.25 kbps, for the selected mode, so that the full-rate frames may be supported.

As variable-rate vocoder frames are introduced to the non-compatible system, an infrastructure element in the non-compatible system re-orders the bits of each variable-rate vocoder frame for transmission as Class A, Class B, or Class C bits. As mentioned above, Class A, Class B, and Class C bits are the payload of the AMR Core Frame. In addition to forming the AMR Core Frame, other parts of the multi-rate frame may be formed by the infrastructure element. The infrastructure element may be any hardware capable of re-ordering bits, and may further be any hardware capable of forming multi-rate vocoder frames. Alternatively, separate infrastructure elements can perform the re-ordering and the multi-rate vocoder frame generation. Moreover, the multi-purpose infrastructure element may be further configured to further identify the frame type of the variable-rate vocoder frame, or a separate hardware component may serve as a frame type identifier.

The receiver that will receive the multi-rate vocoder frame should be configured in a manner that will allow the differentiation between the various variable-rate frame types carried by the single rate mode. Assuming that the receiver has variable-rate and multi-rate decoding subsystems, the receiver should be able to perform an identification of whether the multi-rate vocoder frame carries a variable-rate vocoder frame or not, and if a variable-rate vocoder frame is carried, the receiver should also be able to perform an identification of the type of variable-rate vocoder frame.

In this embodiment, the identification of whether a multi-rate frame carries a variable-rate vocoder frame is explicitly stated by the use of the single mode index. Hence, the fixed-rate decoding subsystem should be able to extract the Class A, Class B, and Class C bits from the multi-rate frame and pass them to the variable-rate decoding subsystem straightforwardly. Once these bits are extracted, the receiver must differentiate between the various variable-rate frame types in order to determine how to decode the variable-rate frames. As discussed above, the variable-rate frame types are each associated with different transmission parameters that have different decoding requirements. Therefore, knowledge of the frame types is needed to properly decode the variable-rate frames.

In one aspect, a blind rate detection scheme is used to differentiate between the various frame types that could have been carried by the single fixed-rate mode. A description of a blind rate detection scheme is described in U.S. Pat. No. 5,774,496, entitled, "Method and Apparatus or Determining Data Rate of Transmitted Variable Rate Data in a Communications Receiver," which is assigned to the assignee of the present invention and incorporated by reference herein. In a blind rate detection scheme, incoming symbols are provided to multiple paths for decoding. Each path decodes the symbols at one of the possible rates and stores the decoded result until a rate determination is made. Error metrics, which describe the quality of the decoded symbols, are extracted and analyzed to determine the most probable rate at which the incoming symbols were encoded. The stored decoded output corresponding to the selected data rate is then passed to subsequent stages for further processing.

Figure 6:
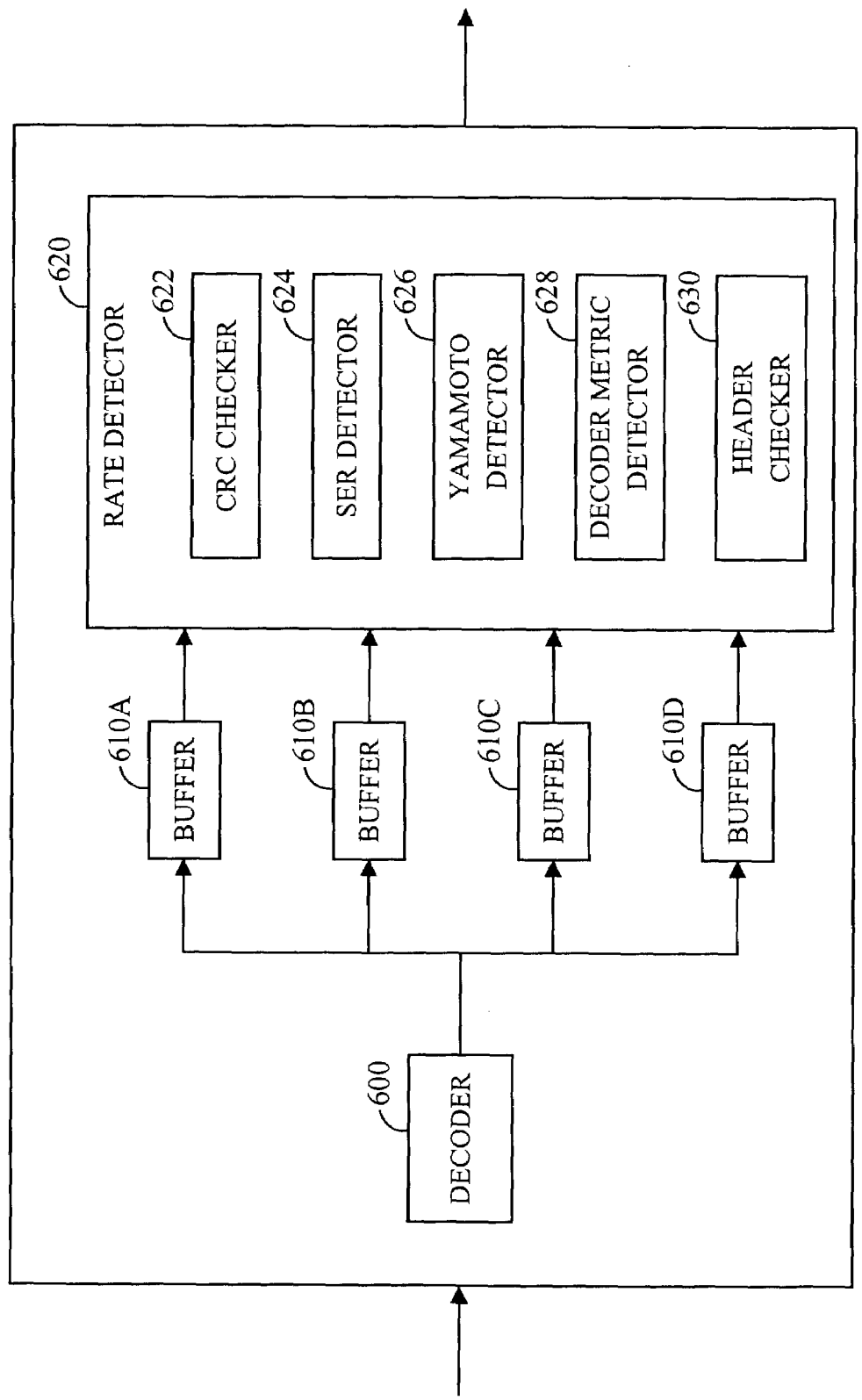
FIG. 6 is a block diagram of an apparatus for performing a blind-rate search.

FIG. 6 is a block diagram of an apparatus that will perform a blind-rate search. A decoding element 600 receives and decodes each received frame in accordance with a set of rate hypotheses. Each rate hypothesis corresponds to a particular hypothesized rate for the received frame, and is associated with a particular set of parameter values used for that rate. For each rate hypothesis, decoding element 600 performs error-correction decoding and provides a decoded frame to a respective buffer 610*a*, 610*b*, 610*c*, or 610*d*. A buffer 610*a*, 610*b*, 610*c*, or 610*d* is provided for each rate. A rate detector 620 receives the decoded frames and selects one of the decoded frames as the transmitted frame based on error metrics. In FIG. 6, the rate detector 620 includes a CRC checker 622, a symbol error rate (SER) detector 624, a Yamamoto metric detector 626, a decoder metric detector 628, and a header checker 630. The rate detector 620 may be implemented with only a subset of these checkers and detectors, or may employ different or additional checkers and detectors.

In another aspect, a pattern-matching scheme is used to differentiate between the various variable-rate frame types that could have been carried by the single fixed-rate mode. It is observed that certain bit patterns correspond to speech parameters that very rarely appear in actual transmissions. As discussed above, speech coders are for extracting speech parameters, and the human vocal tract has certain physical limitations that prevent the generation of some frequency characteristics, such as, for example, dual tones. With knowledge of such characteristics, "non-working" bit patterns associated with these characteristics can be inserted into the payload bits or overhead bits of a fixed-rate frame by the infrastructure element at the transmission end in order to alert the receiving end that the multi-rate frame carries a special cargo. In other words, the receiver would be configured to recognize certain non-working bit patterns as representing a variable-rate frame type, rather than representing fixed-rate voice or data traffic. A non-working bit pattern can be assigned to each variable-rate frame type.

Multiple Modes Embodiments

In another embodiment, the variable-rate vocoder frames are supported by a multi-rate vocoder by reserving a mode index of the multi-rate vocoder for each of the four variable-rate vocoder frame types. As a variable-rate vocoder frame is introduced to a non-compatible system, infrastructure elements within the non-compatible system identify the frame type of the variable-rate vocoder frame and form a multi-rate frame with a specific mode index that is associated with the frame type. The variable-rate vocoder frame is the cargo of the multi-rate vocoder frame, and the specific mode index indicates both the presence of the variable-rate vocoder frame and the type of variable-rate vocoder frame. Hence, four mode indexes would be reserved, each mode reserved for a frame type.

In this embodiment, the multi-rate subsystem and the variable-rate subsystem of the receiving end need less processing resources than the single mode embodiment since neither blind rate detection nor pattern-matching needs to be performed. The use of the four modes explicit identifies both the presence of the variable-rate frame and the nature of the variable-rate frame.

Embedded Frames Embodiments

In another embodiment, the variable-rate vocoder frames are supported by a multi-rate vocoder in the non-compatible communication system by embedding the contents of the variable-rate vocoder frames into the already-reserved modes of the multi-rate vocoder. As a variable-rate vocoder frame is introduced to a non-compatible system, infrastructure elements within the non-compatible system identify the frame type and form a multi-rate frame with overhead bits, wherein the overhead bits serve to communicate the presence of the variable-rate vocoder frame and the frame type of variable-rate vocoder frame.

In this embodiment, a non-working bit pattern would be inserted into the multi-rate frame to provide notice to a receiver that a variable-rate frame is carried as payload (i.e., Class A, Class B, or Class C bits) in a given mode. In one aspect, a single non-working bit pattern would be used to identify the presence of the variable-rate vocoder frame and a blind rate detection scheme would be used to identify the type of variable-rate vocoder frame. In another aspect, at least four different non-working bit patterns would be inserted into the multi-rate frame and the receiver would be configured to detect and recognize the at least four non-working bit patterns. Hence, in this aspect, the nonworking bit patterns are used both to identify the presence of the variable-rate vocoder frame and to identify the type of variable-rate vocoder frame.

Implementation of Embodiments in Wideband Devices

The SMV vocoder and the AMR vocoder discussed above have wideband (WB) counterparts, wherein wideband signals are coded for transmission. A narrowband signal has a frequency range of 4000 Hz, while wideband signal has a frequency range of 7000 Hz, which offers perceptually significant acoustic qualities. Typical landline telephone systems are configured to carry narrowband signals. However, cellular environments need not be band-limited to a narrowband range, so the use of wideband signals to carry speech is a better choice for improved acoustical quality.

Hence, specific implementations of the embodiments will be described herein in the context of the AMR-WB and WB-SMV vocoders, rather than the narrowband versions. However, it should be understood that the configuration details could be extended to suit either narrowband or wideband vocoders without undue experimentation.

The technical specification for the AMR-WB frame structure is found in the document 3GPP TS 26.201 V5.0.0 (2001–03). The technical specification for the WB-SMV frame structure is yet to be released.

For the embodiments wherein each WB-SMV frame type is associated with a mode index of the AMR-WB, Table 3 illustrates an example of how the bits can be reserved for the WB-SMV frame types. In Table 3, the term "ER" refers to an eighth rate frame, "QR" refers to a quarter rate frame, "HR" refers to a half rate frame, and "FR" refers to a full rate frame. The Mode Indexes/Frame Types 10–13 that were previously unassigned in the AMR-WB technical specification are now assigned to support WB-SMV ER, WB-SMV QR, WB-SMV HR, and WB-SMV FR, respectively.

TABLE 3

Interpretation of Frame Type, Mode Indication, and Mode Request Fields

| Mode Index (Frame Type) | Mode Indication | Mode Request | Frame content (AMR-WB mode, comfort noise, or other) |
|---|---|---|---|
| 0 | 0 | 0 | AMR-WB 6.60 kbps |
| 1 | 1 | 1 | AMR-WB 8.85 kbps |
| 2 | 2 | 2 | AMR-WB 12.65 kbps |
| 3 | 3 | 3 | AMR-WB 14.25 kbps |
| 4 | 4 | 4 | AMR-WB 15.85 kbps |

TABLE 3-continued

Interpretation of Frame Type, Mode Indication, and Mode Request Fields

| Mode Index (Frame Type) | Mode Indication | Mode Request | Frame content (AMR-WB mode, comfort noise, or other) |
|---|---|---|---|
| 5 | 5 | 5 | AMR-WB 18.25 kbps |
| 6 | 6 | 6 | AMR-WB 19.85 kbps |
| 7 | 7 | 7 | AMR-WB 23.05 kbps |
| 8 | 8 | 8 | AMR-WB 23.85 kbps |
| 9 | — | — | AMR-WB SID (Comfort Noise Frame) |
| 10 | 9 | 9 | WB-SMV ER @ 1.0 kbps |
| 11 | 10 | 10 | WB-SMV QR @ 2.7 kbps |
| 12 | 11 | 11 | WB-SMV HR @ 6.2 kbps |
| 13 | 12 | 12 | WB-SMV FR @ 13.3 kbps |
| 14 | — | — | Speech lost |
| 15 | — | — | No Data (No transmission/No reception) |

In conjunction with the Frame Type assignment, the number of bits for each class of bits should also be determined. Table 4 shows the number of bits assigned for Class A, Class B, and Class C for each AMR-WB codec mode and WB-SMV codec rates.

TABLE 4

Number of Bits in Classes A, B, and C

| Mode Index (Frame Type) | AMR-WB codec mode (kbps) | Total number of bits | Class A | Class B | Class C |
|---|---|---|---|---|---|
| 0 | 6.60 | 132 | 54 | 78 | 0 |
| 1 | 8.85 | 177 | 64 | 113 | 0 |
| 2 | 12.65 | 253 | 72 | 181 | 0 |
| 3 | 14.25 | 285 | 72 | 213 | 0 |
| 4 | 15.85 | 317 | 72 | 245 | 0 |
| 5 | 18.25 | 365 | 72 | 293 | 0 |
| 6 | 19.85 | 397 | 72 | 325 | 0 |
| 7 | 23.05 | 461 | 72 | 389 | 0 |
| 8 | 23.85 | 477 | 72 | 405 | 0 |
| 10 | 1.0 | 20 | 20 | 0 | 0 |
| 11 | 2.7 | 54 | 54 | 0 | 0 |
| 12 | 6.2 | 124 | 54 | 70 | 0 |
| 13 | 13.3 | 267 | 72 | 195 | 0 |

The assignment of the number of bits for each part of the AMR-WB frame that carries WB-SMV payload, i.e., the AMR-WB Header part, the AMR-WB auxiliary Information part, and the AMR-WB Core Frame part, is presented in Table 5.

TABLE 5

Number of Bits for Different Fields of AMR-WB Frames

| Mode Index | Frame Type | Frame Quality Indicator | Mode Indication | Mode Request | Codec CRC | Class A AMR-WB Core Frame | Class B | Class C | Total |
|---|---|---|---|---|---|---|---|---|---|
| 0 | 4 | 1 | 4 | 4 | 8 | 54 | 78 | 0 | 153 |
| 1 | 4 | 1 | 4 | 4 | 8 | 64 | 113 | 0 | 198 |
| 2 | 4 | 1 | 4 | 4 | 8 | 72 | 181 | 0 | 274 |
| 3 | 4 | 1 | 4 | 4 | 8 | 72 | 213 | 0 | 306 |
| 4 | 4 | 1 | 4 | 4 | 8 | 72 | 245 | 0 | 338 |
| 5 | 4 | 1 | 4 | 4 | 8 | 72 | 293 | 0 | 386 |
| 6 | 4 | 1 | 4 | 4 | 8 | 72 | 325 | 0 | 418 |
| 7 | 4 | 1 | 4 | 4 | 8 | 72 | 389 | 0 | 482 |

TABLE 5-continued

Number of Bits for Different Fields of AMR-WB Frames

| Mode Index | Frame Type | Frame Quality Indicator | Mode Indication | Mode Request | Codec CRC | Class A AMR-WB Core | Class B | Class C Frame | Total |
|---|---|---|---|---|---|---|---|---|---|
| 8  | 4 | 1 | 4 | 4 | 8 | 72 | 405 | 0 | 498 |
| 10 | 4 | 1 | 4 | 4 | 8 | 20 | 0   | 0 | 41  |
| 11 | 4 | 1 | 4 | 4 | 8 | 54 | 0   | 0 | 75  |
| 12 | 4 | 1 | 4 | 4 | 8 | 54 | 70  | 0 | 145 |
| 13 | 4 | 1 | 4 | 4 | 8 | 72 | 195 | 0 | 288 |
| 14 | 4 | 1 | 0 | 0 | 0 | 0  | 0   | 0 | 4   |
| 15 | 4 | 1 | 0 | 0 | 0 | 0  | 0   | 0 | 4   |

In the example of Tables 4 and 5, the WB-SMV frames are carried by Class A and/or Class B bits. However, the WB-SMV frames can also be carried by class C bits, if so desired.

The determination of the number of the Class A, Class B, and Class C bits that are to be used to carry the WB-SMV frame does not complete the re-packaging of the frame. Since the WB-SMV frame carries speech parameters of a speech parameter extraction scheme that differs from the speech parameter extraction of the AMV-WB vocoder, the re-ordering tables that were suitable for regular AMR-WB frames are not optimal for the new AMR-WB frames that carry the WB-SMV frames. Hence, Tables 6, 7, 8, and 9 were created to reorder the bits of the WB-SMV frames.

TABLE 6

Ordering of the speech encoder bits for the WB-SMV 1.0 kbit/s for ER frames

| j = 0 | j = 1 | j = 2 | j = 3 | j = 4 | j = 5 | j = 6 | j = 7 | j = 8 | j = 9 |
|---|---|---|---|---|---|---|---|---|---|
| 0  | 1  | 2  | 3  | 4  | 5  | 6  | 7  | 8  | 9  |
| 10 | 11 | 12 | 13 | 14 | 15 | 16 | 17 | 18 | 19 |

TABLE 7

Ordering of the speech encoder bits for the WB-SMV 2.70 kbit/s for QR frames

| 0  | 1  | 2  | 3  | 4  | 5  | 6  | 7  | 8  | 9  |
|---|---|---|---|---|---|---|---|---|---|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |

TABLE 8

Ordering of the speech encoder bits for the WB-SMV 6.20 kbit/s for HR frames

| 0   | 5   | 6   | 7   | 61  | 84  | 107 | 102 | 62  | 85  |
|---|---|---|---|---|---|---|---|---|---|
| 8   | 4   | 37  | 38  | 39  | 40  | 58  | 81  | 104 | 79  |
| 60  | 83  | 106 | 56  | 108 | 119 | 96  | 41  | 42  | 80  |
| 73  | 1   | 3   | 57  | 103 | 82  | 105 | 59  | 2   | 63  |
| 109 | 110 | 86  | 19  | 22  | 23  | 64  | 87  | 18  | 20  |
| 21  | 17  | 13  | 88  | 43  | 89  | 65  | 111 | 14  | 24  |
| 25  | 26  | 27  | 28  | 15  | 16  | 44  | 90  | 66  | 112 |
| 9   | 11  | 10  | 12  | 67  | 113 | 29  | 30  | 31  | 32  |
| 34  | 33  | 35  | 36  | 45  | 51  | 68  | 74  | 91  | 97  |
| 114 | 120 | 46  | 69  | 92  | 115 | 52  | 75  | 98  | 121 |
| 47  | 70  | 93  | 116 | 53  | 76  | 99  | 122 | 48  | 71  |
| 94  | 117 | 54  | 77  | 100 | 123 | 49  | 72  | 95  | 118 |
| 55  | 78  | 101 | 50  |     |     |     |     |     |     |

TABLE 9

Ordering of the speech encoder bits for the WB-SMV 13.30 kbit/s for FR frames

| 0   | 4   | 6   | 93  | 143 | 196 | 246 | 7   | 5   | 3   |
|---|---|---|---|---|---|---|---|---|---|
| 47  | 48  | 49  | 50  | 51  | 150 | 151 | 152 | 153 | 154 |
| 94  | 144 | 197 | 247 | 99  | 149 | 202 | 252 | 96  | 146 |
| 199 | 249 | 97  | 147 | 200 | 250 | 100 | 203 | 98  | 148 |
| 201 | 251 | 95  | 145 | 198 | 248 | 52  | 2   | 1   | 101 |
| 204 | 155 | 19  | 21  | 12  | 17  | 18  | 20  | 16  | 25  |
| 13  | 10  | 14  | 24  | 23  | 22  | 26  | 8   | 15  | 53  |
| 156 | 31  | 102 | 205 | 9   | 33  | 11  | 103 | 206 | 54  |
| 157 | 28  | 27  | 104 | 207 | 34  | 35  | 29  | 46  | 32  |
| 30  | 55  | 158 | 37  | 36  | 39  | 38  | 40  | 105 | 208 |
| 41  | 42  | 43  | 44  | 45  | 56  | 106 | 159 | 209 | 57  |
| 66  | 75  | 84  | 107 | 116 | 125 | 134 | 160 | 169 | 178 |
| 187 | 210 | 219 | 228 | 237 | 58  | 108 | 161 | 211 | 62  |
| 112 | 165 | 215 | 67  | 117 | 170 | 220 | 71  | 121 | 174 |
| 224 | 76  | 126 | 179 | 229 | 80  | 130 | 183 | 233 | 85  |
| 135 | 188 | 238 | 89  | 139 | 192 | 242 | 59  | 109 | 162 |
| 212 | 63  | 113 | 166 | 216 | 68  | 118 | 171 | 221 | 72  |
| 122 | 175 | 225 | 77  | 127 | 180 | 230 | 81  | 131 | 184 |
| 234 | 86  | 136 | 189 | 239 | 90  | 140 | 193 | 243 | 60  |
| 110 | 163 | 213 | 64  | 114 | 167 | 217 | 69  | 119 | 172 |
| 222 | 73  | 123 | 176 | 226 | 78  | 128 | 181 | 231 | 82  |
| 132 | 185 | 235 | 87  | 137 | 190 | 240 | 91  | 141 | 194 |
| 244 | 61  | 111 | 164 | 214 | 65  | 115 | 168 | 218 | 70  |
| 120 | 173 | 223 | 74  | 124 | 177 | 227 | 79  | 129 | 182 |
| 232 | 83  | 133 | 186 | 236 | 88  | 138 | 191 | 241 | 92  |
| 142 | 195 | 245 | 253 | 254 | 255 | 256 | 257 | 258 | 259 |
| 260 | 261 | 262 | 263 | 264 | 265 | 266 |     |     |     |

Using the tables presented above, any of the WB-SMV frame types can be re-formatted/re-packaged as an AMR-WB frame.

For the embodiments wherein only one AMR-WB frame type/mode/rate is available for assignment or the embodiments wherein all of the WB-SMV frames are embedded in already-assigned AMR-WB frame types, both a blind rate detection scheme and a pattern-matching scheme should be implemented.

Table 10 is an example of a bit pattern scheme, wherein a non-working bit pattern is strategically placed at certain tail bit positions in the AMR-WB Core Frame.

TABLE 10

Bit patterns X, Y, Z, and V embedded in bit positions of an AMR-WB Core Frame (One assigned mode (14.25 kbps) for four WB-SMV rates)

| | d(0) | d(1) | ... | d(20) | ... | D(54) | ... | d(124) | ... | d(267) | ... | d(284) |
|---|---|---|---|---|---|---|---|---|---|---|---|---|
| ER 1.0 kbps | | | | X | X | X | X | X | X | X | X | X |
| QR 2.7 kbps | | | | | | Y | Y | Y | Y | Y | Y | Y |
| HR 6.2 kbps | | | | | | | | Z | Z | Z | Z | Z |
| FR 13.3 kbps 14.25 kbps | | | | | | | | | | V | V | V |

In Table 10, the ER bits (1.0 kbps) include a special X pattern to distinguish the WB-SMV ER frame. The special X pattern is to be found in the area spanned by d(20) to d(284). The ER bits are found in the positions spanned by d(0) to d(19). The QR bits (2.7 kbps) include a special Y pattern to distinguish the WB-SMV QR frame. The special Y pattern is to be found in the area spanned by d(55) to d(284). The HR bits (6.2 kbps) include a special Z pattern to distinguish the WB-SMV HR frame. The special Z pattern is to be found in the area spanned by d(124) to d(284). The FR bits (13.3 kbps) include a special V pattern to distinguish the WB-SMV FR frame. The special V pattern is to be found in the area spanned by d(267) to d(284). If no bit pattern is found, then the determination of the WB-SMV type is performed by a blind-rate detection.

Tables 11, 12 and 13 together comprise another example of a bit pattern scheme, wherein non-working bit patterns are strategically placed at certain tail bit positions in the different AMR-WB frames. In this example, two modes of the AMR-WB vocoder and an SID frame are used to embed the four WB-SMV frames. The four variable-rate vocoder frame types are spread over three modes. Hence, this is an example is a hybrid of the Single Mode embodiment and the Multiple Mode embodiment. Table 11 is for embedding the WB-SMV QR and HR into the 6.6 kbps AMR-WB mode.

TABLE 12

Embedding WB-SMV FR in the 14.25 AMR-WB mode

| | d(0) | d(1) | d(2) | ... | d(265) | D(266) | d(267) | ... | d(283) | d(284) |
|---|---|---|---|---|---|---|---|---|---|---|
| 13.3 kbps 14.25 kbps | | | | | | | X | X | X | X |

AMR-WB Core Frame has a special non-working bit pattern "X" in tail bits d(267) to d(284) to distinguish the contents of the 14.25 AMR-WB frame as a full-rate WB-SMV frame. The lack of non-working bit patterns indicates that blind rate detection should be performed.

TABLE 13

Embedding WB-SMV Eighth Rate Frame in the SID Frame

| | d(0) | d(1) | d(2) | ... | d(18) | D(19) | d(20) | ... | d(33) | d(34) |
|---|---|---|---|---|---|---|---|---|---|---|
| 1.0 kbps SID | | | | | | | X | X | X | X |

TABLE 11

Embedding WB-SMV QR and HR in the 6.6 kbps AMR-WB mode

| | d(0) | d(1) | d(2) | ... | d(52) | d(53) | d(54) | ... | d(123) | d(124) | ... | d(130) | d(131) |
|---|---|---|---|---|---|---|---|---|---|---|---|---|---|
| QR 2.7 kbps | | | | | | | X | X | X | X | X | X | X |
| HR 6.2 kbps 6.6 kbps | | | | ... | | | | | | Y | Y | Y | Y |

AMR-WB Core Frame has a special non-working bit pattern "X" in tail bits d(54) to d(131) to distinguish the contents of the 6.6 kbps mode AMR-WB frame as a quarter-rate WB-SMV frame. A special non-working bit pattern "Y" in tail bits d(124) to d(131) indicates that the contents of the 6.6 kbps mode AMR-WB frame are a half-rate WB-SMV frame. The lack of non-working bit patterns indicates that blind rate detection should be performed.

AMR-WB SID frame has a special non-working bit pattern "X" in tail bits d(20) to d(34) to distinguish the contents of the SID frame as an eighth-rate WB-SMV frame. The lack of non-working bit patterns indicates that blind rate detection should be performed.

It should be noted that the non-working bit patterns are inserted as tail bits in the above examples. However, it should be clear to one of skill in the art that the non-working bit patterns can be inserted at any predetermined location in the frame, i.e., front, middle, etc., so that different bit positions are within the scope of the embodiments described herein.

The specific embodiment described by Tables 11, 12, and 13 has a noticeable advantage over the specific embodiment described by Table 10. Namely, Table 10 describes the use of a fast AMR mode/rate to carry all SMV frames, even the eighth-rate SMV frames that are normally used for background noise. Tables 11, 12, and 13 describe the use of lower rate AMR modes, which are easier to detect and provide better channel protection.

Figure 7:
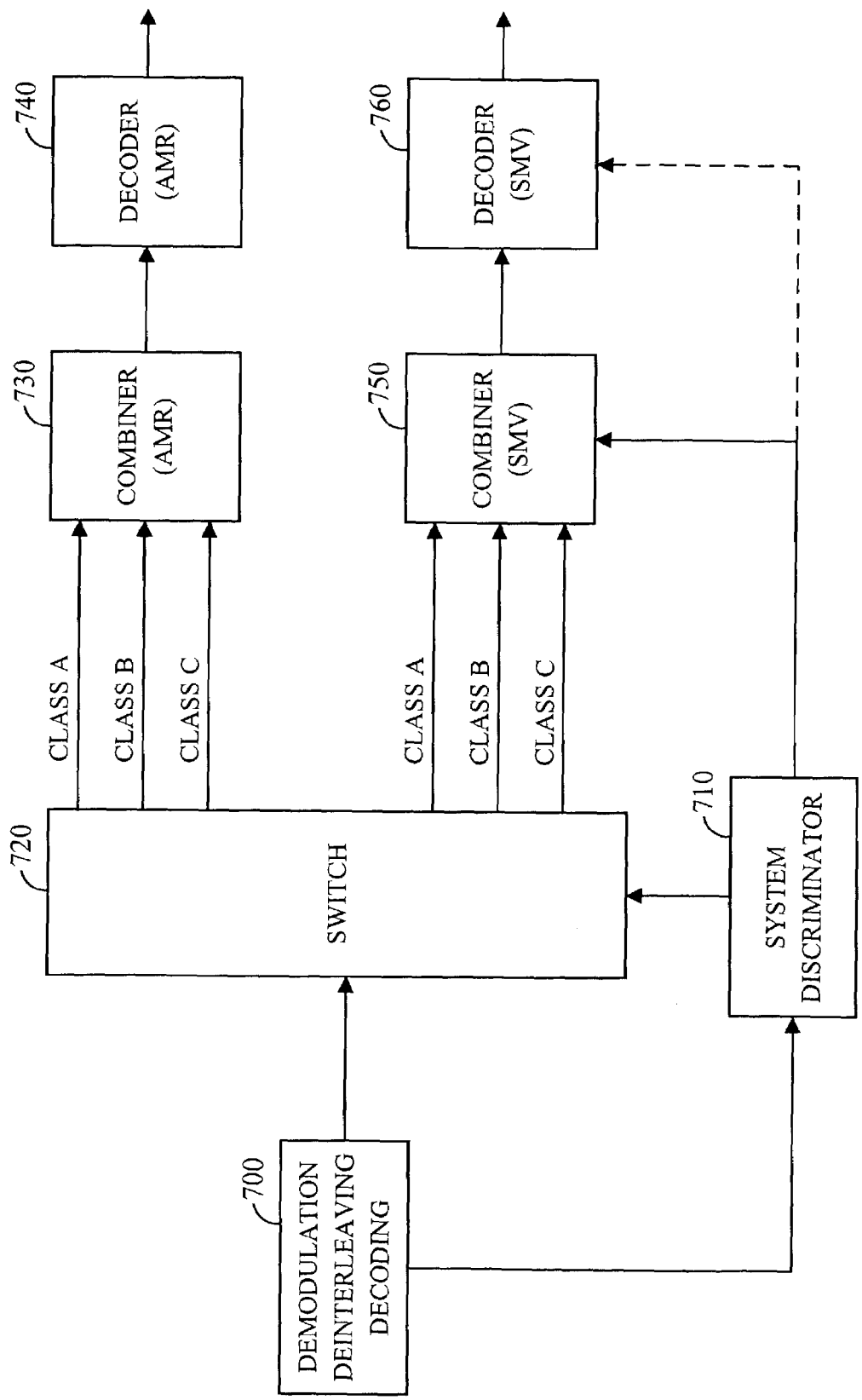
FIG. 7 is a block diagram of an apparatus for processing variable-rate frame cargo within multi-rate frames.

FIG. 7 is a block diagram of an apparatus that is configured to receive a multi-rate vocoder frame and to distinguish between a multi-rate vocoder frame that carries a variable-rate frame cargo and a multi-rate vocoder frame that does not. The apparatus of FIG. 7 is further configured to differentiate between the variable-rate vocoder frame types through the use of a System Discriminator. In one embodiment, the System Discriminator is configured to perform a mode search only, such as the case if the Multiple Mode embodiment described above is implemented. In another embodiment, the System Discriminator is configured to perform a mode search, a pattern search, and/or a blind rate search, if Single Mode or Embedded Frame embodiments are implemented.

A received signal is processed at a Demodulation Subsystem 700, wherein demodulation, deinterleaving, and decoding of the received signal takes place. A System Discriminator 710 determines whether a "normal" multi-rate vocoder frame has arrived in the received signal or if a "special" multi-rate vocoder frame has arrived. The term "normal" is used to describe a multi-rate vocoder frame without a variable-rate vocoder frame payload and the term "special" is used to describe a multi-rate vocoder frame with a variable-rate vocoder frame payload. If the System Discriminator 710 determines that the vocoder frame is normal, then a control signal is sent to a switching element 720 to route the output (Class A, Class B, and Class C bits) from the Demodulation Subsystem 700 to a Multi-Rate Combiner 730. The Multi-Rate Combiner 730 reorders the bits according to the appropriate tables and passes the reordered bits to a Multi-Rate Decoder 740.

If the System Discriminator 710 determines that the vocoder frame is special, then a control signal is sent to a switching element 720 to route the output (Class A, Class B, and Class C bits) from the Demodulation subsystem 700 to a Variable-Rate Combiner 750. The System Discriminator 710 also sends information to the Variable-Rate Combiner 750 as to the type of variable-rate frame received. The Variable-Rate Combiner 750 uses the frame type information to choose an appropriate table by which the bits will be reordered. The Variable-Rate Combiner 750 passes the reordered bits to a Variable-Rate Decoder 760. The System Discriminator 710 may or may not pass the frame type information to the Variable-Rate Decoder 760. The Variable-Rate Decoder 760 may be configured to perform blind rate detection or not. If not, then frame type information is needed from the System Discriminator 710 in order to accurately decode the received signal. If the Variable-Rate Decoder 760 is configured to perform a rate detection scheme, then the frame type information is not needed from the System Discriminator 710.

Figures 8A, 8B:
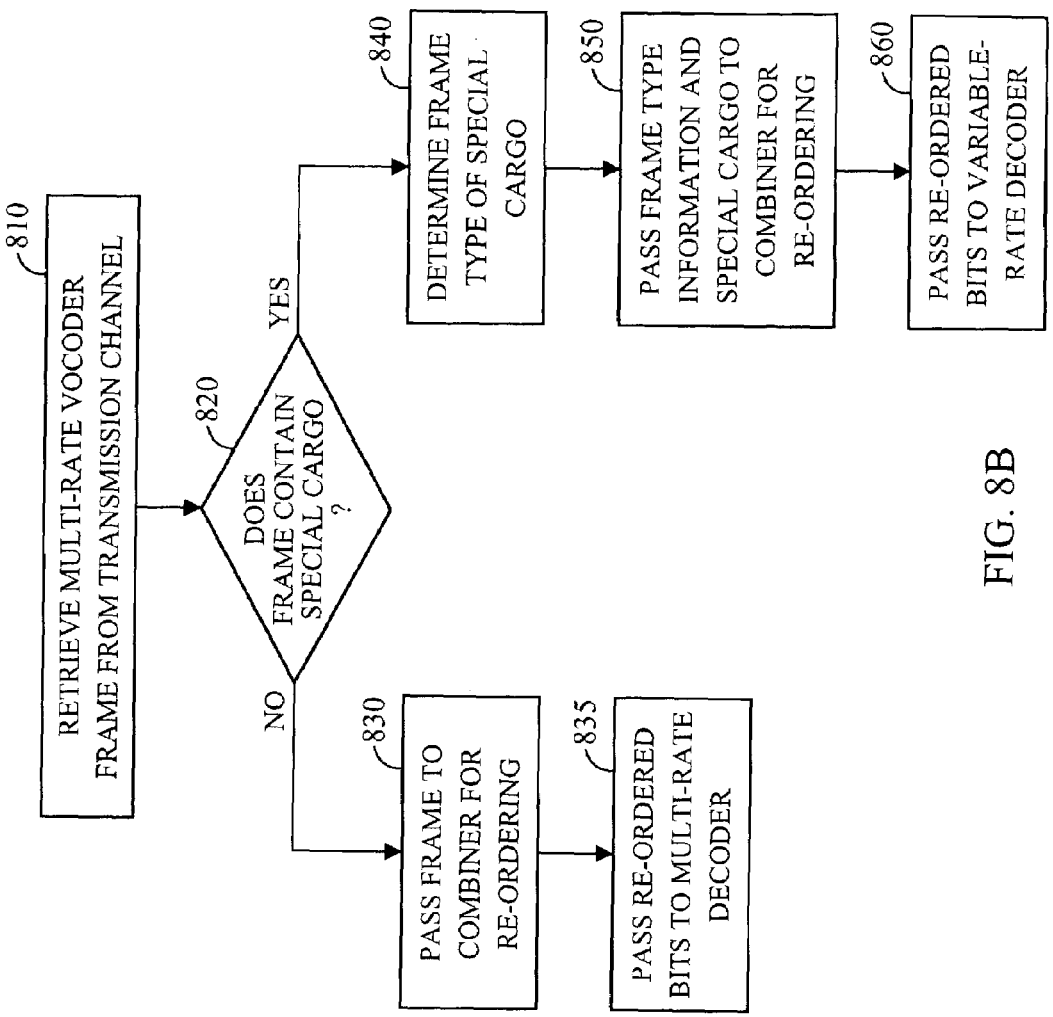
FIG. 8A is a flow chart describing the re-formatting of variable-rate vocoder frames in multi-rate vocoder frames.
FIG. 8B is a flow chart describing the retrieval of variable-rate vocoder frames that had been transmitted within multi-rate vocoder frames.

FIG. 8A and FIG. 8B are flowcharts that illustrate the embodiments described above in a more general manner. FIG. 8A is directed towards a transmission end and FIG. 8B is directed towards a receiving end. At step 800 in FIG. 8A, an infrastructure element in a non-compatible system receives a transmission channel frame carrying a variable-rate vocoder frame. At step 802, the infrastructure element retrieves the variable-rate vocoder frame from the transmission channel frame and identifies the frame type. At step 804, the infrastructure element re-formats the variable-rate vocoder frame into a multi-rate vocoder frame, in accordance with one of the embodiments described above, i.e., the re-formatting comprises the re-ordering of the vocoder frame bits, the embedding of bit patterns, if appropriate, and/or the selection of mode indexes, if appropriate. At step 806, the infrastructure element processes the multi-rate vocoder frame according to a transmission channel format appropriate for the non-compatible system.

At step 810 in FIG. 8B, the demodulation elements of a receiving end demodulates and performs error-correction decoding to a received transmission frame to retrieve the multi-rate vocoder frame. At step 820, the receiving end determines whether the multi-rate vocoder frame contains a special cargo of a variable-rate vocoder frame or contains normal voice and/or data traffic. The determination may be performed either by searching for a mode index value, a special non-working bit pattern, by blind rate detection, or any combination thereof. If the multi-rate vocoder frame comprises normal voice and/or data traffic, then the program flow proceeds to step 830. If the multi-rate vocoder frame comprises a special cargo, then the program flow proceeds to step 840.

At step 830, the multi-rate vocoder frame is passed to a combiner for re-ordering. The program flow proceeds to step 835.

At step 835, the re-ordered multi-rate vocoder frame is passed to a multi-rate decoder for decoding. The program flow then ends.

At step 840, the receiver determines what type of variable-rate vocoder frame was received as special cargo. At step 850, the frame type information determined at step 840 and the special cargo is passed to a combiner so that the special cargo is re-ordered appropriately. At step 860, the re-ordered bits are passed to a variable-rate decoder for decoding. The program flow ends.

For clarity, various aspects, embodiments, and features of the invention have been described for a specific implementation for a W-CDMA system and a cdma2000 system. However, other fixed-rate, multi-rate and variable-rate systems and standards may advantageously be implemented or adopted to support the embodiments described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for supporting the transmission of variable-rate vocoder frames within a non-compatible system, comprising an infrastructure element configured to identity a frame type of a received variable-rate vocoder frame, to re-order bits of the received variable-rate vocoder frame according to the frame type, and to construct a multi-rate vocoder frame using the re-ordered bits and according to the frame type,
wherein the infrastructure element is further configured to insert a non-working bit pattern into the multi-rate vocoder frame, wherein the non-working bit pattern is associated with the frame type.

2. An apparatus for supporting the transmission of variable-rate vocoder frames within a non-compatible system, comprising an infrastructure element configured to identity a frame type of a received variable-rate vocoder frame, to re-order bits of the received variable-rate vocoder frame according to the frame type, and to construct a multi-rate vocoder frame using the re-ordered bits and according to the frame type,
wherein the infrastructure element is further configured to construct the multi-rate vocoder frame by forming a multi-rate vocoder frame with a mode index associated with the frame type.

3. The apparatus of claim 2, wherein the infrastructure element is further configured to construct the multi-rate vocoder frame by inserting a non-working bit pattern into the multi-rate vocoder frame.

4. The apparatus of claim 2, wherein the infrastructure element is further configured to construct the multi-rate vocoder frame by associating each possible frame type with one mode index.

5. An apparatus for supporting the transmission of variable-rate vocoder frames within a non-compatible system, comprising an infrastructure element configured to identity a frame type of a received variable-rate vocoder frame, to re-order bits of the received variable-rate vocoder frame according to the frame type, and to construct a multi-rate vocoder frame using the re-ordered bits,
wherein the infrastructure element is further configured to construct the multi-rate vocoder frame by inserting a non-working bit pattern into the multi-rate vocoder frame.

6. An apparatus for supporting variable-rate vocoder frames within a non-compatible system, comprising:
a demodulation subsystem for demodulating a received multi-rate vocoder frame;
a system discriminator for determining whether the demodulated multi-rate vocoder frame carries a variable-rate vocoder frame as cargo, wherein the system discriminator determines whether the demodulated multi-rate vocoder frame carries a variable-rate vocoder frame by performing a mode index search;
a combiner for re-ordering the multi-rate vocoder frame cargo into a variable-rate vocoder frame; and
a decoder configured to decode the variable-rate vocoder frame.

7. An apparatus for supporting variable-rate vocoder frames within a non-compatible system, comprising:
a demodulation subsystem for demodulating a received multi-rate vocoder frame;
a system discriminator for determining whether the demodulated multi-rate vocoder frame carries a variable-rate vocoder frame as cargo, wherein the system discriminator determines whether the demodulated multi-rate vocoder frame carries a variable-rate vocoder frame by performing a bit pattern search;
a combiner for re-ordering the multi-rate vocoder frame cargo into a variable-rate vocoder frame; and
a decoder configured to decode the variable-rate vocoder frame.

8. An apparatus for supporting variable-rate vocoder frames within a non-compatible system, comprising:
a demodulation subsystem for demodulating a received multi-rate vocoder frame;
a system discriminator for determining whether the demodulated multi-rate vocoder frame carries a variable-rate vocoder frame as cargo, wherein the system discriminator determines whether the demodulated multi-rate vocoder frame carries a variable-rate vocoder frame by performing a blind rate search;
a combiner for re-ordering the multi-rate vocoder frame cargo into a variable-rate vocoder frame; and
a decoder configured to decode the variable-rate vocoder frame.

9. An apparatus for supporting variable-rate vocoder frames within a non-compatible system, comprising:

a demodulation subsystem for demodulating a received multi-rate vocoder frame;

a system discriminator for determining whether the demodulated multi-rate vocoder frame carries a variable-rate vocoder frame as cargo, wherein the system discriminator is further for determining a frame type of the variable-rate vocoder frame if the system discriminator determines that the demodulated multi-rate vocoder frame carries a variable-rate vocoder frame;

a combiner for re-ordering the multi-rate vocoder frame cargo into a variable-rate vocoder frame; and a decoder configured to decode the variable-rate vocoder frame.

10. The apparatus of claim 9, wherein system discriminator determines the frame type of the variable-rate vocoder frame by determining the mode of the demodulated multi-rate vocoder frame.

11. The apparatus of claim 9, wherein system discriminator determines the frame type of the variable-rate vocoder frame by performing a bit pattern search.

12. The apparatus of claim 9, wherein system discriminator determines the frame type of the variable-rate vocoder frame by performing a blind rate detection.

13. A method for re-formatting variable-rate vocoder frames as multi-rate vocoder frames, comprising:
   identifying a frame type of a received variable-rate vocoder frame;
   re-ordering the bits of the received variable-rate vocoder frame; and
   constructing a multi-rate vocoder frame, wherein the re-ordered bits comprise a cargo of the multi-rate vocoder frame and a nonvariable-rate mode index is attached to the multi-rate vocoder frame.

14. The method of claim 13, wherein constructing the multi-rate vocoder frame comprises embedding a non-working bit pattern as another cargo of the multi-rate vocoder frame, wherein the non-working bit pattern is for identifying the presence of the variable-rate vocoder frame in the multi-rate vocoder frame.

15. A method for re-formatting variable-rate vocoder frames as multi-rate vocoder frames, comprising:
   identifying a frame type of a received variable-rate vocoder frame;
   re-ordering the bits of the received variable-rate vocoder frame; and
   constructing a multi-rate vocoder frame, wherein the re-ordered bits comprise a cargo of the multi-rate vocoder frame and a variable-rate mode index is attached to the multi-rate vocoder frame.

16. The method of claim 15, wherein constructing the multi-rate vocoder frame comprises embedding a non-working bit pattern as another cargo of the multi-rate vocoder frame, wherein the non-working bit pattern is for identifying the frame type of the variable-rate vocoder frame.

17. The method of claim 15, wherein the variable-rate mode index indicates the frame type of the variable-rate vocoder frame.

18. A method for supporting variable-rate vocoder frames within a non-compatible system, comprising:
   receiving a multi-rate vocoder frame;
   determining whether the multi-rate vocoder frame carries a variable-rate vocoder frame cargo by performing a mode index determination;
   if the multi-rate vocoder frame carries a variable-rate vocoder frame cargo, then:
      identifying a frame type of the variable-rate vocoder frame cargo;
      re-ordering the variable-rate vocoder frame cargo into a variable-rate vocoder frame; and
      decoding the variable-rate vocoder frame.

19. A method for supporting variable-rate vocoder frames within a non-compatible system, comprising:
   receiving a multi-rate vocoder frame;
   determining whether the multi-rate vocoder frame carries a variable-rate vocoder frame cargo by performing a non-working bit pattern search;
   if the multi-rate vocoder frame carries a variable-rate vocoder frame cargo, then:
      identifying a frame type of the variable-rate vocoder frame cargo;
      re-ordering the variable-rate vocoder frame cargo into a variable-rate vocoder frame; and
      decoding the variable-rate vocoder frame.

20. A method for supporting variable-rate vocoder frames within a non-compatible system, comprising:
   receiving a multi-rate vocoder frame;
   determining whether the multi-rate vocoder frame carries a variable-rate vocoder frame cargo by performing a blind-rate detection;
   if the multi-rate vocoder frame carries a variable-rate vocoder frame cargo, then:
      identifying a frame type of the variable-rate vocoder frame cargo;
      re-ordering the variable-rate vocoder frame cargo into a variable-rate vocoder frame; and
      decoding the variable-rate vocoder frame.

21. A method for supporting variable-rate vocoder frames within a non-compatible system, comprising:
   receiving a multi-rate vocoder frame;
   determining whether the multi-rate vocoder frame carries a variable-rate vocoder frame cargo;
   if the multi-rate vocoder frame carries a variable-rate vocoder frame cargo, then:
      identifying a frame type of the variable-rate vocoder frame cargo by a mode index determination;
      re-ordering the variable-rate vocoder frame cargo into a variable-rate vocoder frame; and
      decoding the variable-rate vocoder frame.

22. A method for supporting variable-rate vocoder frames within a non-compatible system, comprising:
   receiving a multi-rate vocoder frame;
   determining whether the multi-rate vocoder frame carries a variable-rate vocoder frame cargo;
   if the multi-rate vocoder frame carries a variable-rate vocoder frame cargo, then:
      identifying a frame type of the variable-rate vocoder frame cargo by a non-working bit pattern search;
      re-ordering the variable-rate vocoder frame cargo into a variable-rate vocoder frame; and
      decoding the variable-rate vocoder frame.

23. A method for supporting variable-rate vocoder frames within a non-compatible system, comprising:
   receiving a multi-rate vocoder frame;
   determining whether the multi-rate vocoder frame carries a variable-rate vocoder frame cargo;
   if the multi-rate vocoder frame carries a variable-rate vocoder frame cargo, then:
      identifying a frame type of the variable-rate vocoder frame cargo by a blind-rate determination;
      re-ordering the variable-rate vocoder frame cargo into a variable-rate vocoder frame; and
      decoding the variable-rate vocoder frame.

24. An apparatus for re-formatting variable-rate vocoder frames as multi-rate vocoder frames, comprising:
   means for identifying a frame type of a received variable-rate vocoder frame;
   means for re-ordering the bits of the received variable-rate vocoder frame; and
   means for constructing a multi-rate vocoder frame, wherein the re-ordered bits comprise a cargo of the multi-rate vocoder frame and a variable-rate mode index is attached to the multi-rate vocoder frame.

25. An apparatus for supporting variable-rate vocoder frames within a non-compatible system, comprising:
   means for receiving a multi-rate vocoder frame;
   means for determining whether the multi-rate vocoder frame carries a variable-rate vocoder frame cargo;
   means for identifying a frame type of the variable-rate vocoder frame cargo if the multi-rate vocoder frame carries a variable-rate vocoder frame cargo, wherein the identifying means performs a mode index determination;
   means for re-ordering the variable-rate vocoder frame cargo into a variable-rate vocoder frame; and
   means for decoding the variable-rate vocoder frame.

* * * * *